A. SCHWEMMER.
LOCKING MEANS FOR AUTOMOBILES.
APPLICATION FILED MAY 27, 1920.

1,363,676.

Patented Dec. 28, 1920.

Inventor
AUGUST SCHWEMMER
By his Attorney
E. Cummings Sanborn

UNITED STATES PATENT OFFICE.

AUGUST SCHWEMMER, OF BROOKLYN, NEW YORK.

LOCKING MEANS FOR AUTOMOBILES.

1,363,676. Specification of Letters Patent. Patented Dec. 28, 1920.

Application filed May 27, 1920. Serial No. 384,635.

*To all whom it may concern:*

Be it known that I, AUGUST SCHWEMMER, a citizen of the United States of America, residing at 334 South Fifth St., Brooklyn, in the county of Kings and State of New York, have invented certain new and useful Improvements in Locking Means for Automobiles, of which the following is a specification.

This invention relates to locking means for automobiles and is chiefly concerned with the provision of simple, reliable, and practical means for preventing an automobile from being stolen or operated by an unauthorized person.

The principal object of my invention is to provide efficient lever-operated means controllable from adjacent one of the seats of the vehicle for locking the drive shaft of the automobile against rotation. Other objects reside in certain details of construction which will appear as the description is hereinafter developed and will be pointed out in the appended claims.

Referring to the drawings wherein I have shown what I now consider to be the preferred form of my invention:

Figure 1 is a side elevation of parts constituting my invention showing their application to an automobile.

Fig. 2 is a view in elevation of certain parts for locking the drive shaft against rotation, one of the sections of the containing casing being removed and part of the casing shown in section.

Fig. 3 is a sectional view taken on line 3—3 of Fig. 2, certain parts appearing in elevation.

Fig. 4 is a front elevation, partly in section of parts shown in Fig. 1.

Figs. 5 and 6 are views of details.

1 designates an automobile which may be of any conventional or standard type. Supported from the rear axle housing 2 by means of a brace 3 is a casing 4 in which is mounted means for preventing the drive shaft 5 from rotating. The brace 3, as shown, comprises arm portions 6 and 7 extending from the rear axle housing to casing 4 parallel to the drive shaft and an intermediate portion 8 between said arms, to which portion casing 4 is secured. The casing 4 may be conveniently formed, as shown, in three sections, a bottom section 9, and a pair of transverse upper sections 10 and 11, all securely bolted or otherwise fastened together. The drive shaft 5 is inclosed within a housing 12, as is common in many types of present day automobiles, and said housing is cut away or formed in sections to make room for casing 4. The drive shaft 5 extends through said casing 4 and suitable projections or hubs may be provided at opposite sides of casing 4 surrounding shaft 5 for supporting the adjacent end portions of the sections of housing 12, one of said hubs being shown clearly at 13 in Fig. 5. Fixed in any suitable manner to shaft 5 for rotation therewith within casing 4 is a toothed member 14. Said toothed member is shown formed of two sections 14' and 14" having at one end coöperating hub portions 15, 15' bolted together and at the other end similar coöperating hub portions 16, 16' likewise bolted together. The toothed member 14 may be secured to shaft 5 by means of a screw 17 passing through hub portion 15' and into said shaft 5. Mounted for movement about pivots 18, 18' within casing 4 are notched locking members 19, 19'. Springs 20, 20' attached each at one end to a corresponding member 19, 19' and at their other ends to casing 4 serve to maintain said locking members normally out of engagement with the teeth of member 14. For moving said members 19, 19' into position wherein their notches engage certain of the teeth of member 14, a cam 21 is secured to a shaft 22 at a point within casing 4. Cam 21 is so arranged with respect to members 19 and 19' that when said cam is turned from its dotted line position in Fig. 2 to its full line position it engages the ends of members 19 and 19' on the side of pivots 18, 18' remote from springs 20, 20' and swings said members 19, 19' into a position wherein their notches receive certain of the teeth of member 14. By means of cam 21, the locking members 19, 19' are thus caused to grip firmly the toothed member 14 and to hold drive shaft 5 from rotation as long as said cam is in the full line position shown in Fig. 2. When said cam is turned to its dotted line position in Fig. 2, springs 20, 20' retract locking members 19, 19' to their dotted line position and shaft 5 is free to be rotated.

Shaft 22 which carries cam 21 extends outside of casing 4 and is provided with a crank arm 23. If desired a bearing 24 depending from the floor of the car may be provided for the end of shaft 22 adjacent arm 23. A link 25 connects crank 23 with a lever 26 pivoted at 27 within a casing 28 adjacent one of the seats of the automobile, which may be the driver's seat. With this construction it will now readily be seen that, by moving the lever 26, cam 21 may be turned to cause the locking or unlocking of shaft 5. A suitable lock 29, which may be a Yale lock or a lock of any other suitable or conventional type, is provided for locking lever 26 in the position which it occupies when cam 21 is in the full line position in Fig. 2. I have also shown in Fig. 6 casing 28 provided with a hinged cover 30 provided with notches 31 and 32 adapted to receive lever 26. After the lever has been moved to cause cam 21 to assume its position shown in full lines in Fig. 2, said lever may be locked by locking means 29 and cover 30 may be swung down so as to cause notch 31 to receive the lever 26. When the lever 26 is moved to position for releasing drive shaft 5, which is its position shown in Fig. 4, cover 30 is swung down so that said lever is received in notch 32. The latter notch serves to prevent lever 26 from being moved accidentally, or by the jarring of the vehicle, into position for locking drive shaft 5 against rotation, and obviates the necessity for providing a lock for retaining lever 26 in shaft releasing position. To move lever 26 to shaft locking position, cover 30 must be raised to release said lever from engagement with said notch 32.

While I have described a specific embodiment of my invention I wish it to be understood that modifications thereof can be made, within the scope of the appended claims, without departing from the spirit of the invention.

Having described my invention, what I claim and desire to secure by Letters Patent is:

1. In combination with an automobile having an incased drive shaft, a casing through which said drive shaft extends, means comprising rotatable gripping members within said casing for locking said shaft against rotation, resilient means for causing movement of said members, means including a rotatable member for operating said gripping members against the action of said resilient means, a crank secured to said rotatable member, a lever mounted adjacent one of the seats of the vehicle, and a link connecting said lever with said crank.

2. In combination with an automobile having a drive shaft, means for preventing rotation of said shaft, a lever for operating said means, a casing within which said lever is pivoted, and a cover hinged to said casing and having a notch adapted to receive said lever.

3. In combination with an automobile having a drive shaft, a casing through which said shaft extends, a plurality of projections on said shaft within said casing, a plurality of notched members pivotally mounted within said casing, a rotatable cam within said casing adapted to move said notched members into position for gripping the projections on said shaft, springs connected with said notched members and said casing for urging said notched members into a position out of engagement with said projections, a shaft on which said cam is mounted, a lever pivoted adjacent a seat of the automobile, and means connecting said lever with said shaft.

4. In combination with an automobile having an incased drive shaft, a casing through which said shaft extends, a plurality of projections on said shaft within said casing, a plurality of notched members pivotally mounted intermediate their ends within said casing, a rotatable cam positioned between said members on one side of the pivots thereof, springs connected with said notched members on the side of said pivots opposite from said cam for urging said notched members into a position out of engagement with said projections, a shaft on which said cam is mounted, a lever pivoted adjacent a seat of the automobile, a crank secured to said shaft for rotation therewith, and a link connecting said lever and said crank.

In testimony whereof I have affixed my signature.

AUGUST SCHWEMMER.